(12) United States Patent
Zund et al.

(10) Patent No.: US 10,262,642 B2
(45) Date of Patent: Apr. 16, 2019

(54) AUGMENTED REALITY MUSIC COMPOSITION

(71) Applicants: DISNEY ENTERPRISES, INC., Burbank, CA (US); EIDGENOESSISCHE TECHNISCHE HOCHSCHULE ZURICH, Zurich (CH)

(72) Inventors: Fabio Zund, Zurich (CH); Alessia Marra, Zurich (CH); Maurizio Nitti, Zurich (CH); Mattia Ryffel, Bern (CH); Robert Sumner, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 73 days.

(21) Appl. No.: 15/591,052

(22) Filed: May 9, 2017

(65) Prior Publication Data

US 2017/0287456 A1 Oct. 5, 2017

Related U.S. Application Data

(63) Continuation of application No. 15/089,816, filed on Apr. 4, 2016, now Pat. No. 9,679,547.

(51) Int. Cl.
*G10H 1/00* (2006.01)
*G10H 1/36* (2006.01)
(Continued)

(52) U.S. Cl.
CPC ......... *G10H 1/0025* (2013.01); *A63F 13/211* (2014.09); *A63F 13/213* (2014.09);
(Continued)

(58) Field of Classification Search
CPC ... G06T 19/006; G06T 2200/24; G06T 15/00; G10D 1/00; G10H 1/368; G10H 2220/101; G10H 2220/126; G10H 2220/116
See application file for complete search history.

(56) References Cited

U.S. PATENT DOCUMENTS

| | | |
|---|---|---|
| 5,728,960 A | 3/1998 | Sitrick |
| 6,570,078 B2 | 5/2003 | Ludwig |

(Continued)

OTHER PUBLICATIONS

Poupyrev et al., Augmented Reality Interface for Electronic Music Performance, http://www.ivanpoupyrev.com/e-library/2001/hci2001_agroove.pdf, Last accessed Oct. 2, 2015, pp. 1-4.

(Continued)

*Primary Examiner* — Marlon T Fletcher
(74) *Attorney, Agent, or Firm* — Sheppard Mullin Richter & Hampton LLP

(57) ABSTRACT

Systems and methods for re-arranging a musical composition using augmented reality are disclosed. A user can be provided with one or more physical image markers representative of at least one of a musical entity and a musical style in which a musical track has been pre-recorded. Upon capturing a visual scene in which one or more of these physical image markers are included, an augmented reality version of the visual scene is displayed along with audio corresponding to the musical style(s) and/or entities represented by the one or more physical image markers.

10 Claims, 6 Drawing Sheets

(51) Int. Cl.
  *G06T 19/00* (2011.01)
  *G06T 13/20* (2011.01)
  *A63F 13/211* (2014.01)
  *A63F 13/213* (2014.01)
  *A63F 13/25* (2014.01)
  *A63F 13/814* (2014.01)
  *A63F 13/92* (2014.01)
  *G06K 9/00* (2006.01)
  *G06K 9/20* (2006.01)
  *G06K 9/78* (2006.01)
  *H04N 5/445* (2011.01)

(52) U.S. Cl.
  CPC ............ *A63F 13/25* (2014.09); *A63F 13/814* (2014.09); *A63F 13/92* (2014.09); *G06K 9/00671* (2013.01); *G06K 9/2063* (2013.01); *G06K 9/78* (2013.01); *G06T 13/20* (2013.01); *G06T 19/006* (2013.01); *G10H 1/368* (2013.01); *H04N 5/44504* (2013.01); *A63F 2300/1087* (2013.01); *A63F 2300/8047* (2013.01); *G10H 2210/105* (2013.01); *G10H 2220/106* (2013.01); *G10H 2220/121* (2013.01); *G10H 2220/395* (2013.01); *G10H 2220/445* (2013.01); *G10H 2220/455* (2013.01); *G10H 2240/115* (2013.01)

(56) References Cited

U.S. PATENT DOCUMENTS

| | | | |
|---|---|---|---|
| 7,019,205 B1* | 3/2006 | Fujisawa | A63F 13/10 84/609 |
| 7,053,915 B1 | 5/2006 | Jung et al. | |
| 7,754,955 B2 | 7/2010 | Egan | |
| 8,638,301 B2 | 1/2014 | Birnbaum et al. | |
| 8,653,349 B1 | 2/2014 | White et al. | |
| 8,799,821 B1 | 8/2014 | De Rose et al. | |
| 8,866,846 B2 | 10/2014 | Kim | |
| 2004/0089142 A1 | 5/2004 | Georges et al. | |
| 2008/0196575 A1* | 8/2008 | Good | G09B 15/04 84/470 R |
| 2009/0285484 A1 | 11/2009 | Mallinson et al. | |
| 2009/0307207 A1 | 12/2009 | Murray | |
| 2010/0009749 A1* | 1/2010 | Chrzanowski, Jr. | A63F 13/10 463/35 |
| 2010/0178028 A1 | 7/2010 | Wahrhaftig | |
| 2011/0199342 A1 | 8/2011 | Vartanian et al. | |
| 2011/0249024 A1 | 10/2011 | Arrasvuori et al. | |
| 2011/0316793 A1 | 12/2011 | Fushiki | |
| 2012/0131007 A1 | 5/2012 | Bougaev et al. | |
| 2012/0242865 A1 | 9/2012 | Vartanian et al. | |
| 2012/0311508 A1 | 12/2012 | Fleizach | |
| 2013/0011111 A1 | 1/2013 | Abraham et al. | |
| 2013/0174100 A1 | 7/2013 | Seymour et al. | |
| 2014/0028713 A1 | 1/2014 | Keating et al. | |
| 2014/0165000 A1 | 6/2014 | Fleizach et al. | |
| 2015/0209664 A1* | 7/2015 | Haseltine | A63F 13/00 463/31 |
| 2016/0287979 A1* | 10/2016 | Akavia | A63H 33/42 |

OTHER PUBLICATIONS

Corrêa et al., Contributions of an Augmented Reality Musical System for the Stimulation of Motor Skills in Music Therapy Sessions, Learning Disabilities, Mar. 14, 2012, pp. 275-288, InTech.

Edis S.P.A., Edis Christmas AR 3D, https://itunes.apple.com/us/app/edis-christmas-ar-3d/id943916205?mt=8, Last accessed Oct. 2, 2015, version 1, Edis S.p.A.

Augmentedev, Augment—3D Augmented Reality, https://itunes.apple.com/us/app/augment-3d-augmented-reality/d506463171?mt=8, last accessed Oct. 1, 2015, version 2.10.5, AugmenteDev SAS.

* cited by examiner

AUGMENTED REALITY MUSIC COMPOSITION

CROSS-REFERENCE TO RELATED APPLICATIONS

This application is a continuation of U.S. patent application Ser. No. 15/089,816, filed on Apr. 4, 2016, which is incorporated herein by reference in its entirety.

TECHNICAL FIELD

The present disclosure relates generally to augmented and/or virtual reality presentations.

DESCRIPTION OF THE RELATED ART

Many user devices include some form of camera device which may be used to capture an image or a series of images of a physical, real-world scene. The captured images can then be displayed, for instance, on a display of the user device. Certain user devices, by way of an augmented reality application or functionality, may be configured to insert virtual objects into the captured images before and/or while the images are displayed.

BRIEF SUMMARY OF THE DISCLOSURE

In accordance with one embodiment, a computer-implemented method, comprises capturing a visual scene, and identifying a physical image marker within the visual scene. The method further comprises augmenting the visual scene with the augmented reality version of the physical image marker. Further still, the method comprises outputting an augmented reality version of the visual scene for display in conjunction with audio output based upon at least one musical characteristic of the augmented reality version of the physical image marker.

In accordance with another embodiment, an apparatus, comprises at least one camera capturing a visual scene, and an augmented reality component identifying a physical image marker within the visual scene, augmenting the visual scene with the augmented reality version of the physical image marker. The apparatus further comprises a display displaying an augmented reality version of the visual scene, and one or more speakers outputting audio in conjunction with the augmented reality version of the visual scene and based upon at least one musical characteristic of the augmented reality version of the physical image marker.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
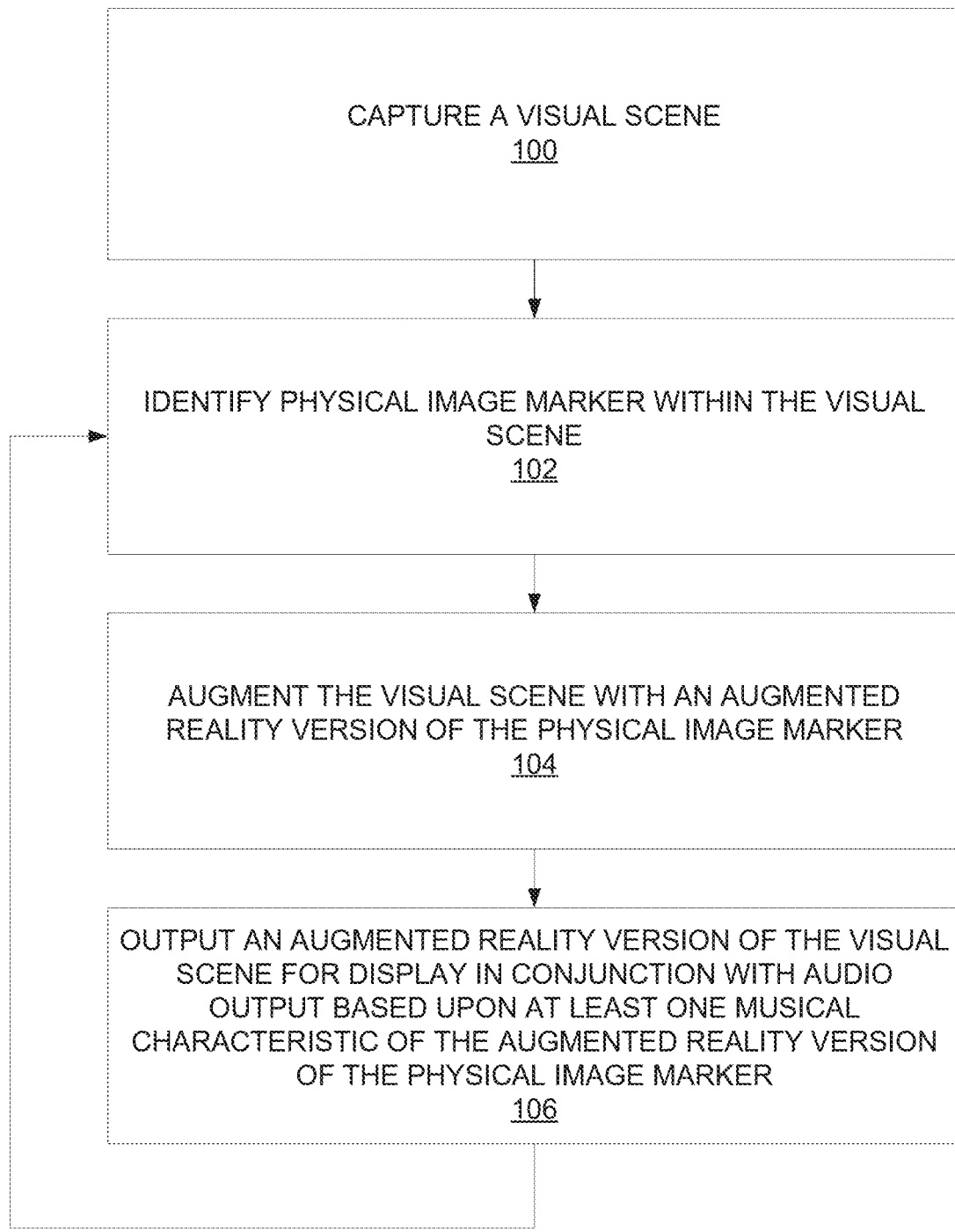
FIG. 1 is an operational flow diagram illustrating an example process for augmented reality music composition in accordance with various embodiments.

The figures are not exhaustive and do not limit the present disclosure to the precise form disclosed.

DETAILED DESCRIPTION

Existing technology for music composition typically focuses on software solutions for professionals. For example, sound mixing software, MIDI, and other tools allow a user to mix audio tracks, activate and deactivate instruments, modulate sound, etc. However, these software solutions often rely on traditional computer interfaces such as a computer display through which user interface elements like buttons and sliders, files, menus, etc. are presented. The majority of music composition software solutions targets professionals. The few aimed at hobbyists still rely on complex user interfaces having a steep learning curve. Leveraging augmented reality technologies in the context of music composition would improve the user experience associated with conventional music composition software, and would also provide a rich, creative, and imaginative experience for experienced and inexperienced users alike, such as children. Such a user experience allows for active discovery which can provide a rich learning experience and provide a foundation for creative problem solving skills. Physical interaction with one's surroundings is a critical component of the experiential learning that lies at the heart of creative play, and provides an alternative to passively consuming content.

Accordingly, various embodiments leverage an augmented reality experience to provide a bridge between real-world musical activities and digital enhancements. In particular, various embodiments provide an augmented reality music composition experience that gives users the freedom to explore different music styles/genres and musical instruments to create unique versions of musical compositions.

For example, a user may be provided with one or more physical image markers, each representing at least a musical entity, such as a vocalist, instrument, or apparatus. In some embodiments, the musical entity may have an associated music style or genre. Examples of musical entities represented by such physical image markers, may include, but are not limited to percussion instruments such as drums, brass instruments such as trumpets, stringed instruments such as violins, guitars, a singer or movie character that sings, and a DJ turntable. The physical image marker itself may be a physical card, chip, etc. In some embodiments, physical image markers may be collectable trading cards and/or stickers users may purchase, exchange, trade, etc. In some embodiments, physical image markers can be used to represent musicians, such as vocalists from popular bands and the like. In some embodiments, the physical image markers may be representative of multiple musical entities, such as a vocalist that plays a guitar, for example.

The user may view or capture a real-world scene via an augmented reality device. Upon placing a physical image marker on a physical board associated with an augmented reality application (within the real-world scene) or simply upon recognition of the physical image marker (within the real-world scene), an augmented version of the instrument, entity, or apparatus represented by the physical image marker is shown and corresponding audio may be played on the augmented reality device.

Figure 2A:
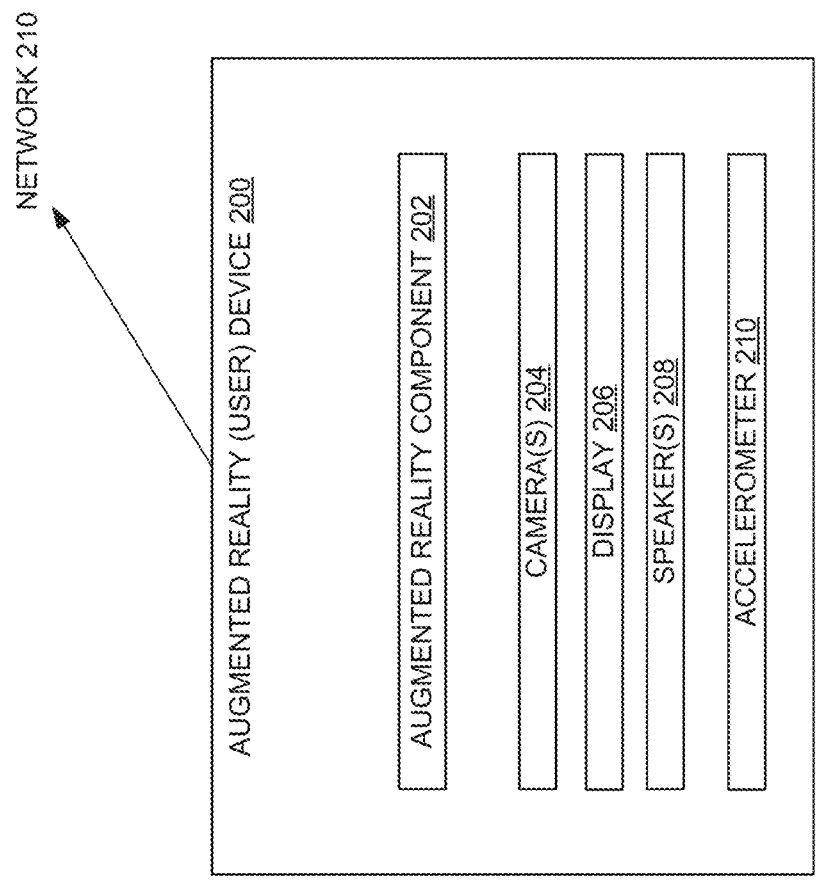
FIG. 2A illustrates an example augmented reality device in accordance with various embodiments.
Figure 2B:
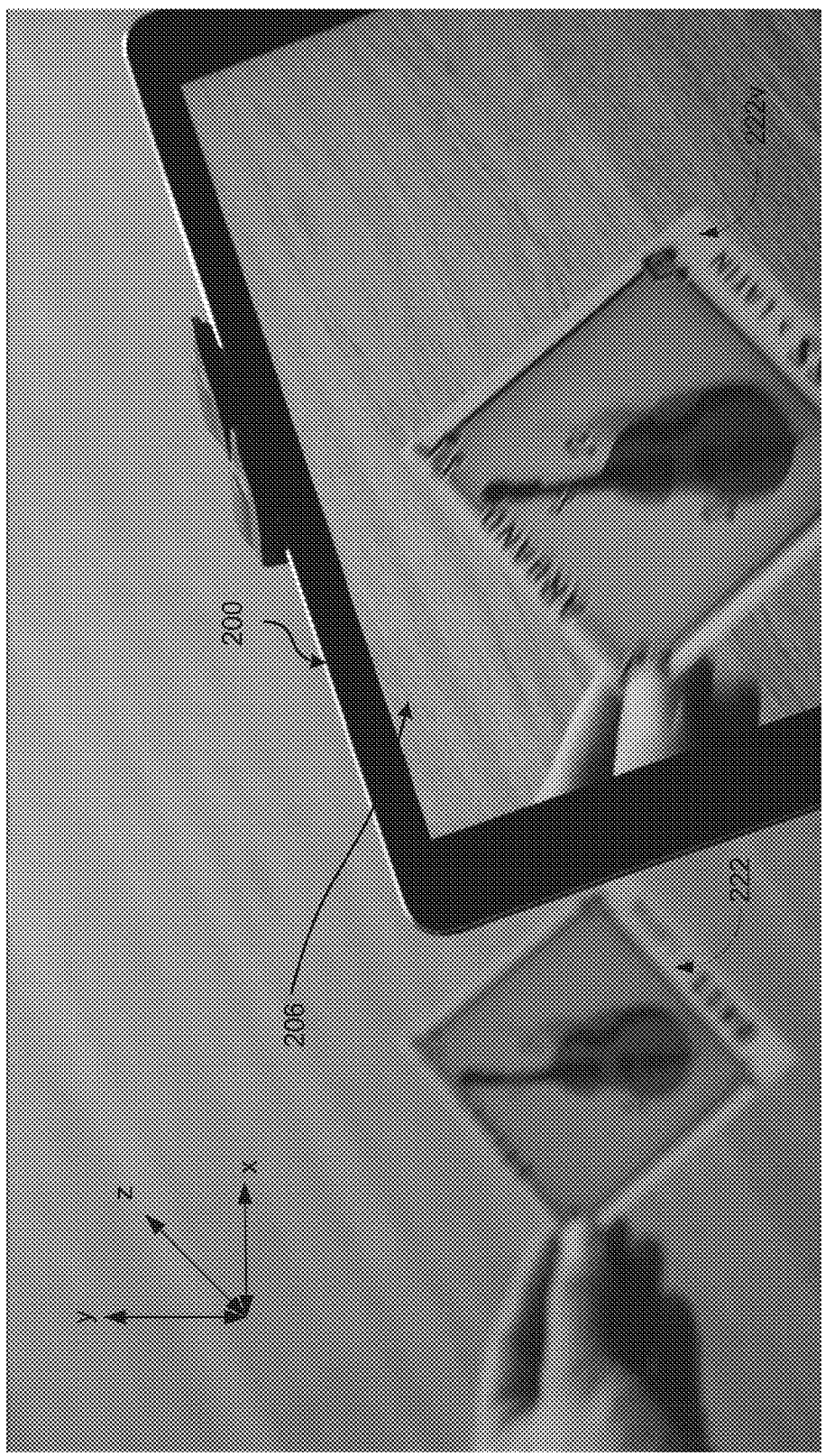
FIGS. 2B-2D illustrate example augmented reality interactions and presentations in accordance with various embodiments.

FIGS. 1, 2A, and 2B will be described in conjunction with each other, where FIG. 1 illustrates example processes performed in accordance with various embodiments for effectuating an augmented reality music composition experience. FIG. 2A is a block diagram of an example user/augmented reality device that may be used to achieve the augmented reality music composition experience, and FIG. 2B illustrates an example of an augmented reality music composition experience in accordance with one embodiment.

At operation 100 of FIG. 1, a visual scene is captured. The visual scene (an example of which is illustrated in FIG. 2B) may be captured by some form of augmented reality device. FIG. 2A is an example representation of such an augmented reality device 200, which may be implemented as solely an augmented reality device or as part of a user device, such as a smart phone or tablet PC. As shown, the augmented reality device 200 includes an augmented reality component 202, one or more cameras 204, a display device 206, one or more speakers 208 and an optional accelerometer 210.

As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments (e.g., adds or modifies) elements using computer graphics technology. Such an augmented reality device may include and/or be communicatively coupled to a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when a user looks at the augmented reality device, the user sees an augmented view of the physical real-world environment in which the user is located.

The one or more cameras 204 may include cameras for capturing the visual scene. As used herein, a visual scene refers to a view(s) of the real-world environment in which the augmented reality device 200 is being used. For instance, a visual scene may be a series of images of a real-world environment. In the example illustrated in FIG. 2B, the visual scene captured by augmented reality device 200 includes a physical image marker 222. Generally, the accelerometer 210 is a device capable of measuring the physical acceleration of the augmented reality device 200. The augmented reality component 202 may use the accelerometer 210 to determine when the position of the augmented reality device 200 is changing, for example, which could indicate that the position of the augmented reality device 200 relative to one or more physical image markers, such as physical image marker 222, is changing. Augmented reality component 202 may also on its own or with assistance from accelerometer 210, determine the positioning of a physical image marker relative to augmented reality device 200.

Returning to FIG. 1, at operation 102, the augmented reality component 202 is configured to identify or otherwise recognize physical image markers within a visual scene which, as described above, can be a series of frames captured using one or more cameras 204 and to transform the depiction of the visual scene on the augmented reality device 200 based on one or more characteristics of the physical image markers recognized within the visual scene. That is, at operation 104, the visual scene is augmented with an augmented reality version of the physical image marker.

In addition to augmentation from a visual perspective, as alluded to above, a musical aspect is also introduced by the augmented reality version of the physical image marker. Accordingly, at operation 106, the visual scene is output for display in conjunction with audio output (via one or more speakers 208) based upon at least one musical characteristic of the augmented reality version of the physical image marker.

In particular, when composing music, a composer develops melodies and rhythms, decides on keys, scales, chords, and tempi, and chooses instruments for each part of a musical composition. Most often, the composer will adhere to a specific music style while writing the musical composition. While many styles or genres of music exist, common categories of styles may include Alternative, Blues, Classical, Dance, Hip-Hop, Pop, Jazz, Soul, Rock, and World. Such music styles often dictate specific rhythmic elements, instruments, and scales. Nevertheless, most any musical composition can be re-arranged with different instruments, tempi, and rhythm to express a different musical style. For example, playing a known Punk-Rock song arranged for electric guitars and standard drums can be re-arranged in a Reggae style, where the electric guitars and standard drums may be replaced with horns, keyboards, and bongos or steel drums, and the Punk-Rock rhythm and tempo can be altered to comport with a Reggae rhythm and tempo. Despite such re-arrangements, the theme and the feeling of the "original" song can be maintained.

Various embodiments of the present disclosure allow for such re-arrangement using the augmented reality method and device described above. A composer or re-arranger can record individual tracks of a song using different instruments and/or different styles. Thus, the musical elements of a particular song or musical composition can be split into two independent dimensions: style and instrument. For example one track may record a song using a piano. The track may be recorded using the piano in the same style as the original musical composition or may be recorded using the piano in a different style. The aforementioned physical image markers can be used to represent these musical elements as a style-agnostic instrument or as a combination of instrument and style.

Figure 2C:
Figure 2D:
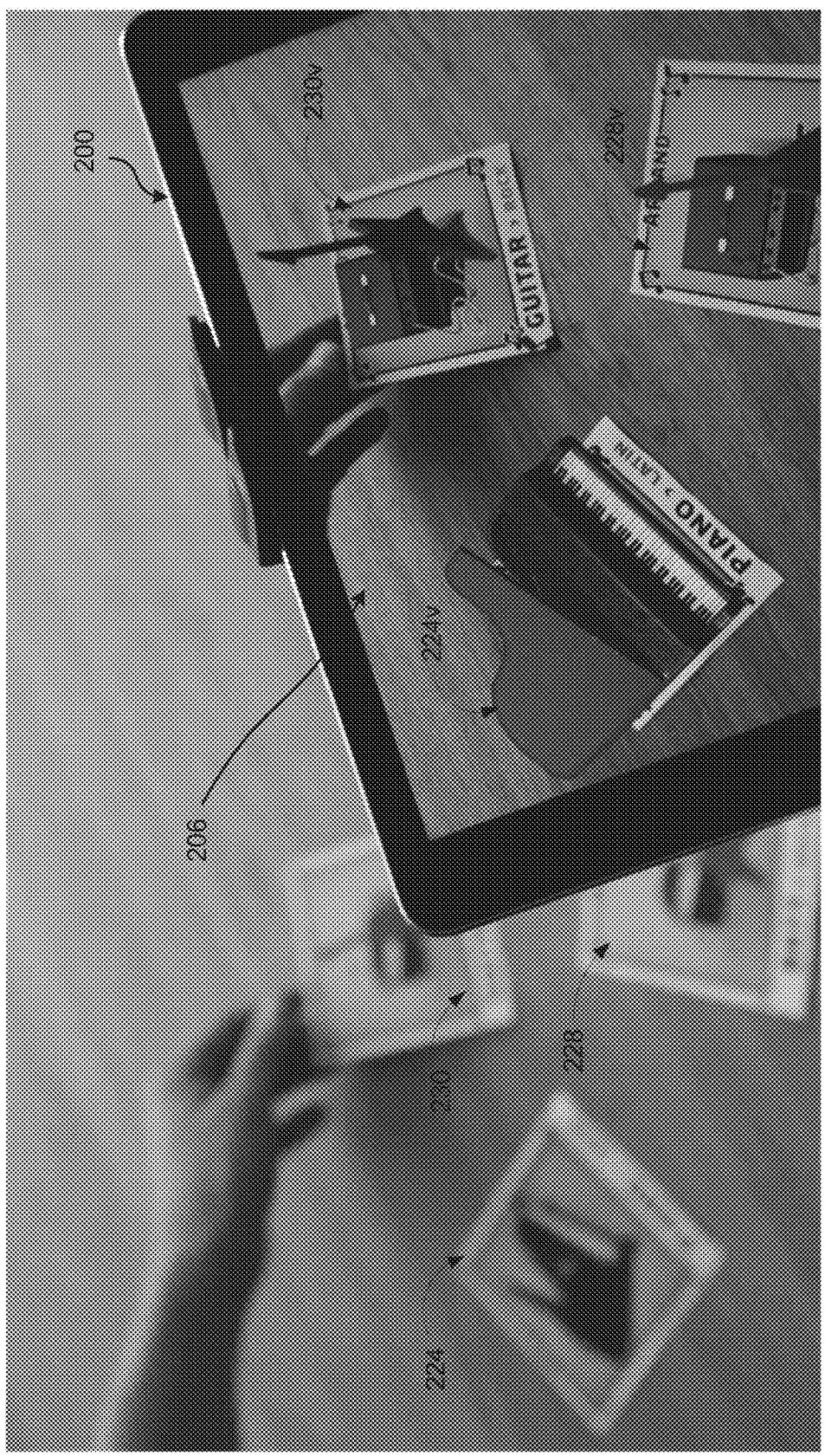

For example, an original musical composition may be re-arranged using a plurality of musical instruments, where each of the musical instruments is associated with a particular music style. That is, a first physical image marker 222 can be used to represent an acoustic bass playing the same musical composition in a Latin style, a second physical image marker 224 can be used to represent a piano playing the same musical composition in a Latin style, and a third physical image marker 226 can be used to represent drums playing the same musical composition in a Latin style (FIG. 2C). Additionally, a fourth physical image marker 228 can be used to represent an electric guitar playing a musical composition in a Rock style, and a fifth physical image marker 230 can be used to represent an electric bass guitar also playing the musical composition in a Rock style (FIG. 2D).

In one embodiment, a physical image marker may be configured with a transmitter (e.g., a radio frequency (RF) transmitter) that sends out a signal encoded with data specifying a type identifier. In such an embodiment, the augmented reality component 202 could receive the signal (e.g., using a receiver or transceiver on the augmented reality device 200) and determine the type identifier encoded within the signal. The augmented reality component 202 could then determine the type of music style and/or instrument that is represented by that physical image marker.

In another embodiment, the physical image marker may contain an embedded watermark or other indicia that identifies the type of music style and/or instrument represented by the physical image marker. For instance, the physical image marker could contain a quick response (QR) code that specifies a type identifier corresponding to the type of music style and/or instrument represented by the physical image marker. More generally, however, any type of marker capable of identifying a type or a type identifier may be used. The augmented reality component 202 could then detect the embedded marker using one or more cameras 204 of the augmented reality device 200 and could determine the type of music style and/or instrument represented by the physical image marker. In a particular embodiment, the embedded marker is impossible or difficult to detect using the human eye. For example, the embedded marker could be expressed using an infrared-absorbing material that is invisible or nearly invisible to the human eye.

Upon identifying a physical image marker within the visual scene, the augmented reality component 202 could then retrieve predefined data associated with the identified physical image marker. For example, the augmented reality component 202 could determine that physical image marker 222 is representative of an acoustic bass playing in a Latin style. Thus, augmented reality component 202 can retrieve corresponding augmentation data (i.e., a music track in which an acoustic bass is playing a musical composition in a Latin style) and present that to the user via display 206 (and speakers, not shown) of augmented reality device 200. That is, the augmented reality component 202 can render a series of frames depicting an augmented virtual scene based on the augmentation data. It should be noted that this is performed for all identified physical image markers simultaneously to allow for simultaneous play of multiple musical entities. It should be further noted that augmented reality component 202 is aware of the current temporal position of a music track currently being played such that the introduction and/or removal of a physical image marker in the visual scene coincides or corresponds to the appropriate portion of the music track to be played.

From the user's perspective, the user can choose instruments and styles independently and create a newly arranged version of a musical composition. To arrange the song, the user may "insert" one or more physical image markers into a visual scene. For example, and as illustrated in FIG. 2C, the user may insert physical image markers 222, 224, and 226 into the visual scene. The augmented reality component 202 of augmented reality device 200 may then identify the physical image marker(s) presented in the visual and present the appropriate musical tracks (previously recorded).

In some embodiments, the user may purchase or obtain the aforementioned musical tracks from or via the augmented reality application. That is, the user may purchase a set of musical tracks corresponding to a song or may purchase individual musical tracks according to the desires of the user. Different styles of musical tracks may also be purchased or otherwise obtained.

It should be noted that the presentation of the appropriate musical tracks is done in a musically cohesive manner. That is, the individual musical tracks represented by the physical image markers may play the same song in the same key and in the same tempo. In this way, any combination of physical image markers and their corresponding musical tracks can be used to create an arrangement that is musically pleasing.

For example, as illustrated in FIG. 2C, the use of physical image markers 222, 224, and 226 result in an augmented reality version of a musical composition (represented by augmented reality versions 222v, 224v, and 226v of physical image markers 222, 224, and 226, respectively) that is presented in a Latin style using a piano track, a drum track, and an acoustic bass track.

Moreover, each physical image marker may be associated with more than one musical track. For example, within a style, for example, there may be different versions of that style, whether relating to tempo, some other stylistic variation on the style, or any other musically-related variation. In this way, augmented reality component 202 can choose one of the plurality of variations at random, in some predetermined or default order (where removal and re-entry of the physical image marker may result in the presentation in a different one of the plurality of variations), etc. Additionally still, augmented reality component 202 may, according to some algorithm or predetermined instructions, play a slightly different musical track (e.g., one of the stylistic sub-variations) if a particular one of another physical image marker is present in the visual scene. For example, if a physical image marker representative of a saxophone is present alone (or in the absence of a physical image marker representative of a lead vocalist), a "flashly" solo Jazz style musical track is played. however, if the physical image marker representative of the lead vocalist is identified in the visual scene along with that of the saxophone, a "backup" Jazz style musical track can be played to better complement the lead vocalist musical track.

In some embodiments, game mechanics can be implemented in the augmented reality application such that the use, movement, placement, etc. of the physical image markers can be used to teach users about music arranging, for example. That is, the augmented reality application can provide visual and/or audio cues regarding which physical image markers to place in the visual scene, and incorporate one or more teaching elements associated therewith. In other embodiments, the user's use, movement, and/or placement of physical image markers can be in the context of a game, where correct usage, movement, and/or placement of particular physical image markers (considering compatibility of styles or tempi, for example) can be rewarded, or can result in game advancement. In still other embodiments, when physical image markers are used to represent musicians, for example, those musicians can be imbued with related properties, such as skills regarding rhythm, stamina, precision, etc. A game can involve multiple users or a user and computer player, wherein the user(s) can arrange bands, orchestras, etc. with different musicians and/or musical entities with "correct" properties or to provide the "best sounding" arrangements.

In the example illustrated in FIG. 2D, however, the user has chosen to keep physical image marker 222 (representative of a piano track in a Latin style) and replace physical image markers 224 and 226 with physical image markers 228 and 230. Accordingly, the resulting augmented reality version of the visual scene is output such that the musical aspect includes a Latin style piano track (via augmented reality version 224v of physical image marker 224), a Rock style electric guitar track (via augmented reality version 228v of physical image marker 228), and a Rock style electric bass guitar track (via augmented reality version 230v of physical image marker 230). It should be noted that the arrangement or re-arrangement of a musical composition is accomplished in real or near-real time in accordance with a user's inclusion, removal, and/or replacement of a physical image marker in the visual scene. In this way, there is no latency or delay in the corresponding presentation of the augmented reality version of the visual scene and audio to the user.

As should also be appreciated, in addition to identifying a physical image marker type, the augmented reality component 202 can use predefined geometric data associated with the type of musical instrument to augment the augmented reality version of the instrument's appearance. For instance, and referring to FIG. 2C, such geometric data could specify the shape and dimensions of each instrument, and the augmented reality component 202 could use this information to render frames realistically depicting a 3D image/rendering of each of the instruments. Moreover, one or more aspects of a physical image marker, such as the depicted instrument or other aspects (in the example of FIG. 2C, the illustrated notes) can be animated.

As alluded to previously, use of the disclosed embodiments can include placement of the physical image markers on a physical augmented reality board or mat, although the of a reality board or mat is optional. The augmented reality board or mat can be used to define an operative area of the visual scene in which the aforementioned features of musical composition using the physical image markers can be utilized. Like the physical image markers, one or more aspects of the augmented reality board or mat can also be presented in an augmented reality fashion.

The position of the physical image marker relative to augmented reality device 200 can also be used to control and simulate spatial aspects of a musical composition. That is, and referring back to FIG. 2B, moving a physical image marker in any one or more directions (x, y, and/or z) can result in a change in the manner in which the visual and audio aspect(s) of the augmented reality version of a physical image marker is presented. For example, the closer (along the z-axis) a user brings a physical image marker to the one or more cameras 204 of augmented reality device 200, the sound of that instrument may be louder and vice versa. Movement along the x and y axes may also affect the stereo aspect of a composition. Thus, when a user moves a physical image marker further to one side or another or up or down relative to the augmented reality version of the visual scene, the perceived source of the audio will also move accordingly. This variation in the spatial composition can be accomplished while a physical image marker is fully visualized in the visual scene and/or can be accomplished in conjunction with the user moving one or more physical image markers in and out of the view of the one or more cameras 204 of augmented reality device 200. Hence, the user can intuitively explore different spatial compositions to produce a unique arrangement of the song.

It should be noted that the user can record or share arrangements created by the user. Moreover, the connectivity aspects of the augmented reality device 200 can be leveraged to allow for multi-user implementations of various embodiments of the present disclosure. For example, multiple users can collaborate with each other to create unique musical arrangements or compositions using their own respective augmented reality devices.

Figure 3:
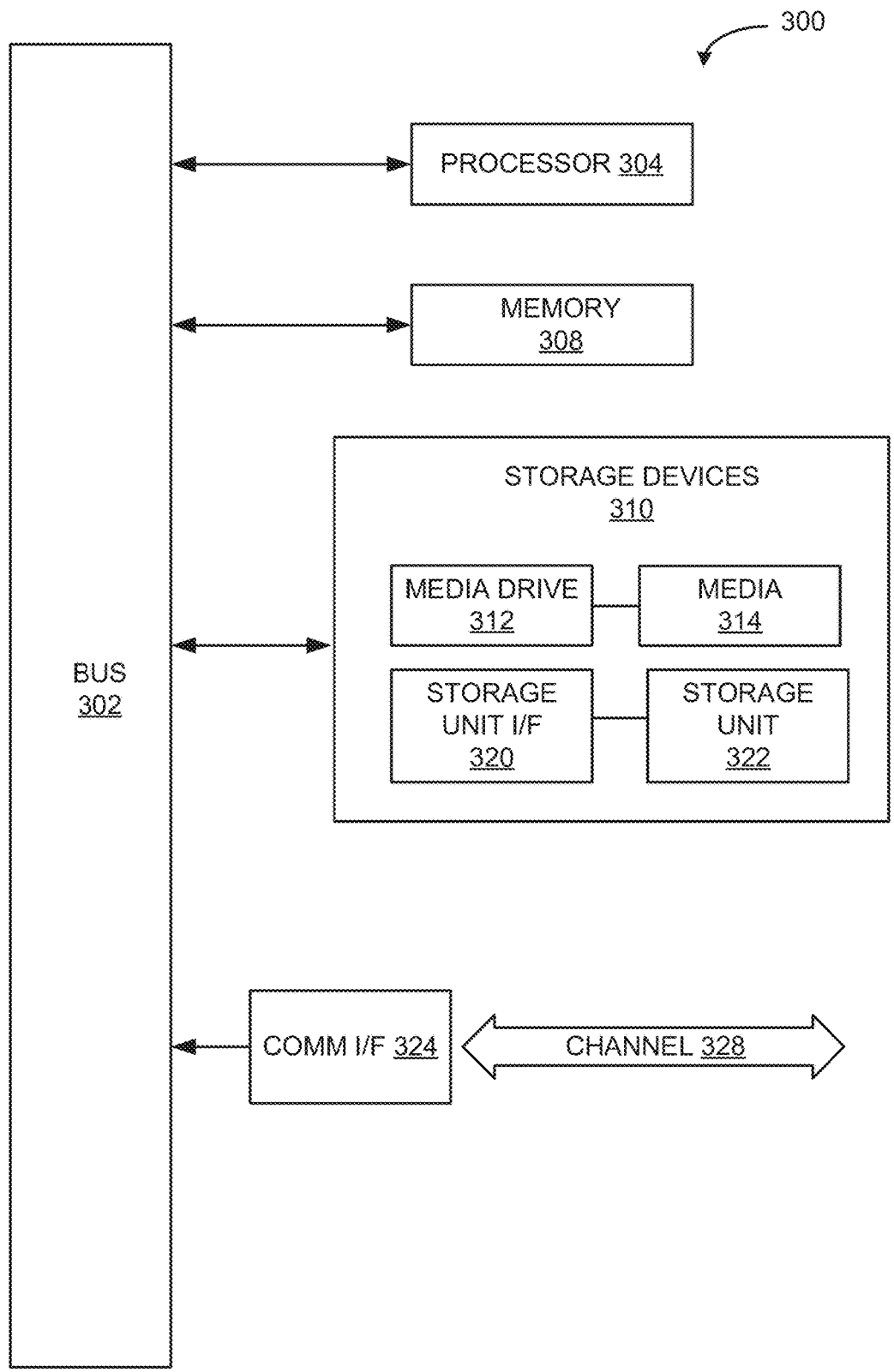
FIG. 3 is an example computing module that may be used to implement various features of embodiments described in the present disclosure.

FIG. 3 illustrates an example computing module that may be used to implement various features of the system and methods disclosed herein, for example, augmented reality device 200 and augmented reality component 202.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 300. After reading this description, it will become apparent to a person skilled in the relevant art how to implement the application using other computing modules or architectures.

Referring now to FIG. 3, computing module 300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example navigation systems, portable computing devices, and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 314 might include, for example, a hard disk, an integrated circuit assembly, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
capturing a visual scene;
identifying a physical image marker within the visual scene, the physical image marker representing a first musical entity;
augmenting the visual scene with the augmented reality version of the physical image marker;
outputting an augmented reality version of the visual scene for display as part of a computerized game in conjunction with audio output based upon a first portion of a musical arrangement of a musical composition, the first portion of the musical arrangement comprising a first musical style and sound characteristics associated with the first musical entity, the musical arrangement being re-arrangeable within the augmented reality version of the visual scene; and advancing gameplay within the computerized game upon a determination that the musical arrangement maintains a musical theme and impression of the musical composition.

2. The computer-implemented method of claim 1 further comprising, presenting at least one of audio and visual cues regarding at least one of movement and placement of the physical image marker within the visual scene.

3. The computer-implemented method of claim 2, wherein the at least one of audio and visual cues reflects the at least one of the movement and placement of the physical image marker comporting with the maintenance of the musical theme and impression of the musical composition.

4. The computer-implemented method of claim 1 further comprising, determining the maintenance of the musical theme and impression of the musical composition by determining compatibility of at least one of the first musical style and tempo of the first musical style with the musical theme and impression of the musical composition.

5. A computer-implemented method, comprising:
capturing a visual scene;
identifying a first set of physical image markers within the visual scene, the first set of physical image markers representing a first set of musical entities;
augmenting the visual scene with augmented reality versions of the first set of physical image markers;
outputting an augmented reality version of the visual scene for display as part of a computerized game in conjunction with audio output based upon a first musical arrangement of a musical composition, the first musical arrangement comprising a first musical style and sound characteristics associated with the first set of musical entities, the first musical arrangement being re-arrangeable within the augmented reality version of the visual scene;
comparing the first musical arrangement with a second musical arrangement; and
determining a preferred musical arrangement between the first musical arrangement and the second musical arrangement.

6. The computer-implemented method of claim 5 further comprising, determining the first musical arrangement based upon at least one of movement and placement of the first set of the physical image markers representing the first set of musical entities.

7. The computer-implemented method of claim 5, further comprising:
augmenting the visual scene with an augmented reality version of a second set of physical image markers representing a second set of musical entities; and
outputting the augmented reality version of the visual scene for display as part of the computerized game in conjunction with additional audio output based upon the second musical arrangement of the musical composition.

8. The computer-implemented method of claim 7, wherein the second musical arrangement comprises a second musical style and sound characteristics associated with a second set of musical entities, the second musical arrangement being re-arrangeable within the augmented reality version of the visual scene.

9. The computer-implemented method of claim 7 further comprising, determining the second musical arrangement based upon at least one of movement and placement of the second set of the physical image markers representing the second set of musical entities.

10. The computer-implemented method of claim 5 further comprising, determining the preferred musical arrangement based upon a determination that the first or second arrangement maintains a musical theme and impression of the musical composition.

\* \* \* \* \*

UNITED STATES PATENT AND TRADEMARK OFFICE
CERTIFICATE OF CORRECTION

PATENT NO. : 10,262,642 B2
APPLICATION NO. : 15/591052
DATED : April 16, 2019
INVENTOR(S) : Fabio Zund et al.

Page 1 of 1

It is certified that error appears in the above-identified patent and that said Letters Patent is hereby corrected as shown below:

On the Title Page

Please change the Assignee listing to add the joint assignee as follows:
Disney Enterprises, Inc., Burbank, CA (US)
ETH Zurich (Eidgenoessische Technische Hochschule Zurich), Zurich, CH Signed and Sealed this
Twenty-sixth Day of November, 2019

Andrei Iancu
*Director of the United States Patent and Trademark Office*